United States Patent
Heyden

(10) Patent No.: US 9,578,990 B2
(45) Date of Patent: Feb. 28, 2017

(54) DEVICE FOR CRACKING AN EGG

(71) Applicant: Matthew Heyden, Cape Coral, FL (US)

(72) Inventor: Matthew Heyden, Cape Coral, FL (US)

( * ) Notice: Subject to any disclaimer, the term of this patent is extended or adjusted under 35 U.S.C. 154(b) by 75 days.

(21) Appl. No.: 14/644,474

(22) Filed: Mar. 11, 2015

(65) Prior Publication Data
US 2015/0257604 A1  Sep. 17, 2015

Related U.S. Application Data

(60) Provisional application No. 61/951,156, filed on Mar. 11, 2014, provisional application No. 62/042,822, filed on Aug. 28, 2014.

(51) Int. Cl.
| | |
|---|---|
| A23N 5/00 | (2006.01) |
| A47J 43/14 | (2006.01) |
| B26B 27/00 | (2006.01) |
| B26B 3/00 | (2006.01) |
| B26B 29/02 | (2006.01) |

(52) U.S. Cl.
CPC .................. *A47J 43/14* (2013.01); *B26B 3/00* (2013.01); *B26B 27/007* (2013.01); *B26B 29/02* (2013.01)

(58) Field of Classification Search
CPC .......... A47J 43/14; B26B 27/007; B26B 3/00; B26B 29/02
USPC .... 30/120.1, 120.2, 120.3; 99/568, 577, 496
See application file for complete search history.

(56) References Cited

U.S. PATENT DOCUMENTS

| | | | | |
|---|---|---|---|---|
| 2,476,356 A | * | 7/1949 | Cook | A47J 43/14 425/DIG. 218 |
| 3,888,006 A | * | 6/1975 | Roberts | A01D 46/247 30/232 |
| 5,038,479 A | * | 8/1991 | Davis | B26B 27/007 30/113.1 |
| 5,588,214 A | * | 12/1996 | Nelson | B26B 27/007 30/298 |
| 2008/0017049 A1 | * | 1/2008 | O'Connor | A47J 43/14 99/484 |
| 2010/0199504 A1 | * | 8/2010 | Caldwell | B26B 27/007 30/298 |

* cited by examiner

*Primary Examiner* — Omar Flores Sanchez
(74) *Attorney, Agent, or Firm* — Justin Lampel

(57) ABSTRACT

A device for cracking eggs is provided. The device has a generally flat blade portion secured to an arched base portion. The generally flat blade portion is used to cut or crack the egg. The generally flat blade portion is perpendicularly secured to the arched base portion wherein the arched base portion mirrors the arc of the exterior surface of an average egg. A user uses the generally flat blade portion to strike the egg. The arched base portion stops the generally flat blade portion from penetrating the egg past a predetermined point. In some embodiments, a padded attachment or a spring loaded contact surface may be secured to the arched base portion and may prevent the device from over-cutting or cracking the egg. In alternative embodiments, the back of the arched base portion has a loop for securing a finger. Finally, a handle may be secured to the arched base portion to easily grasp the device.

4 Claims, 7 Drawing Sheets

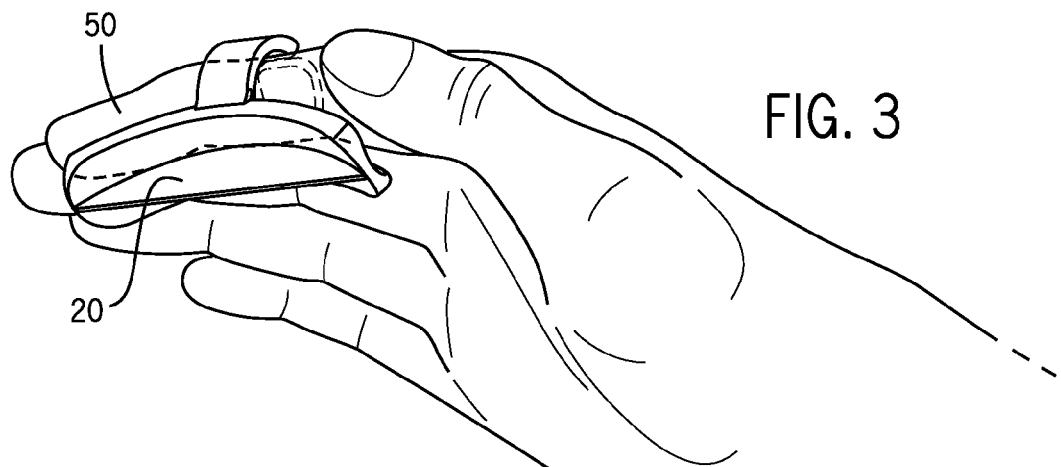
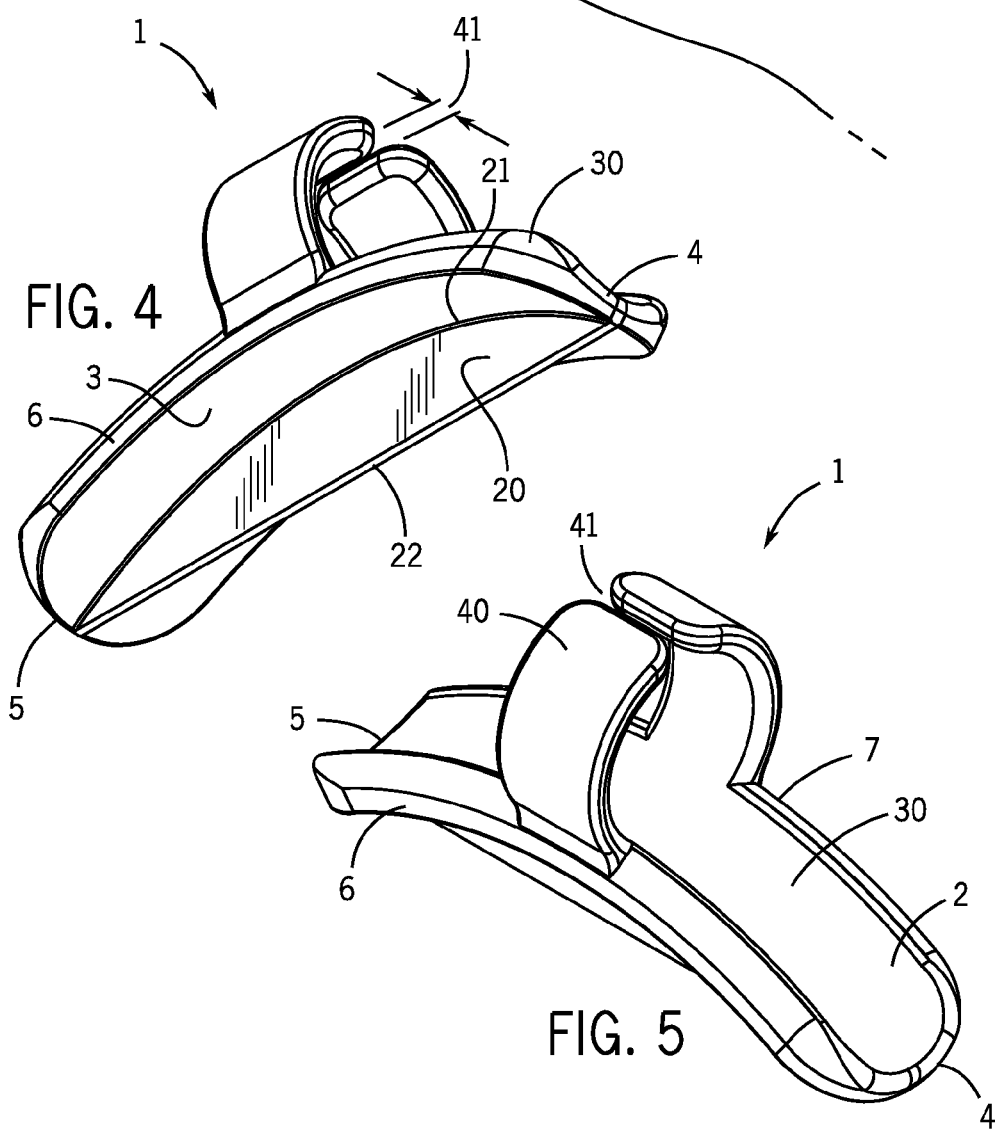

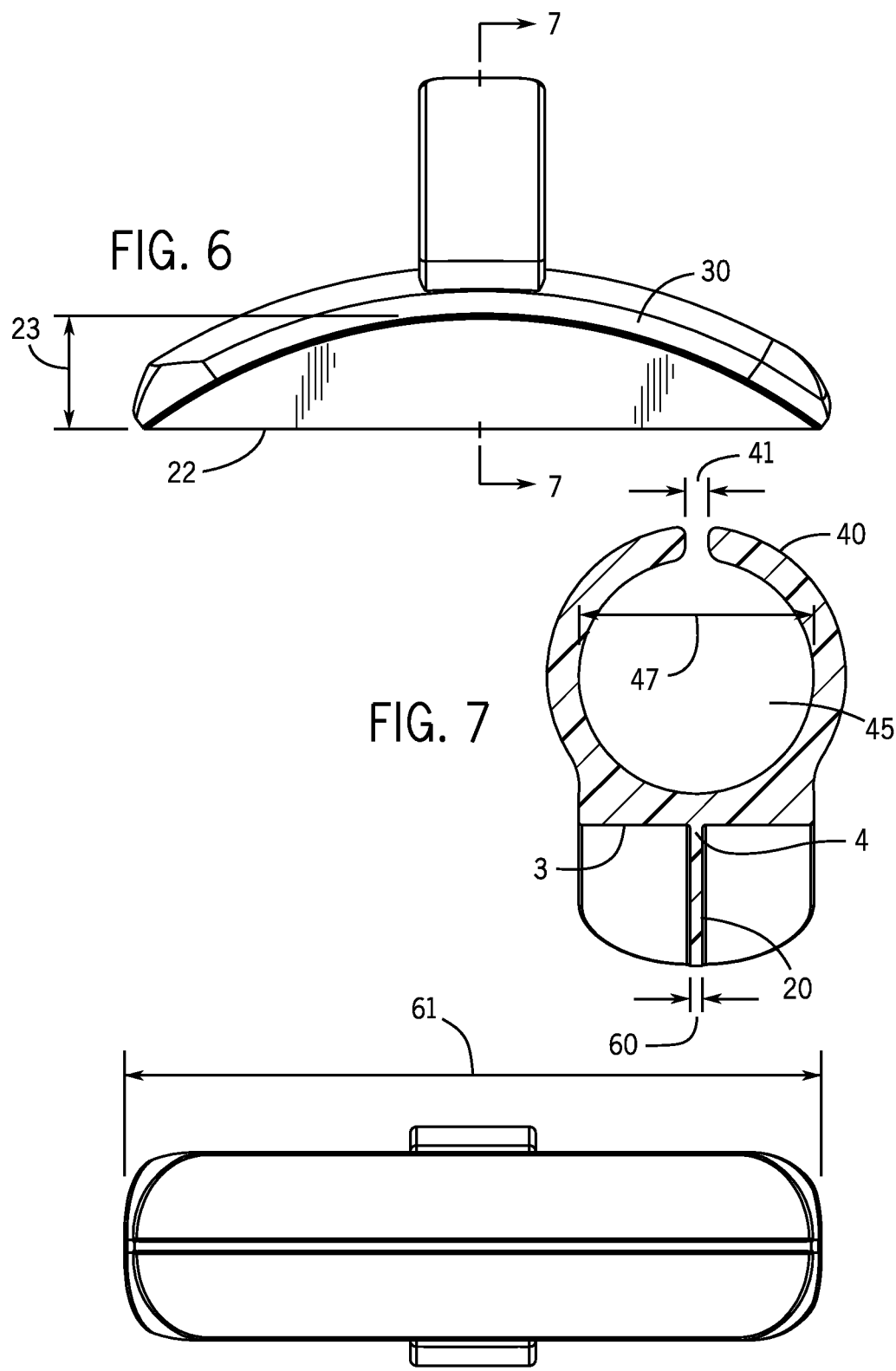

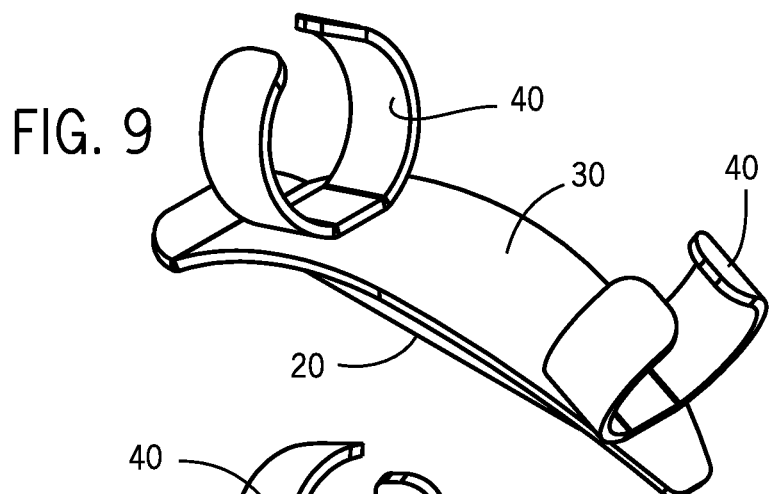
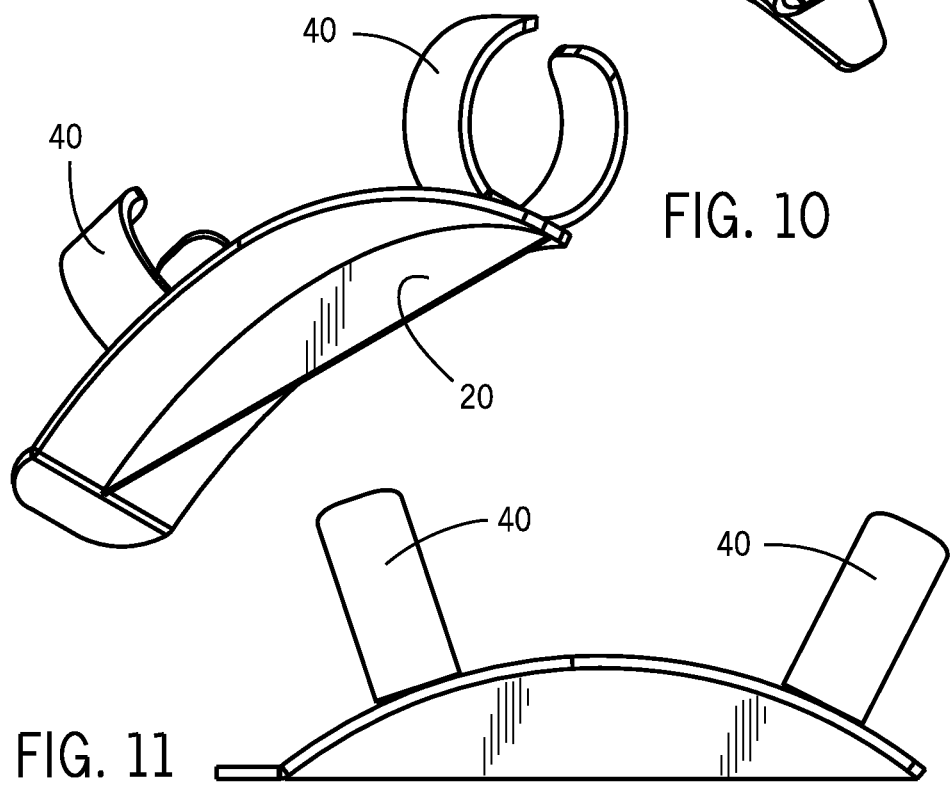
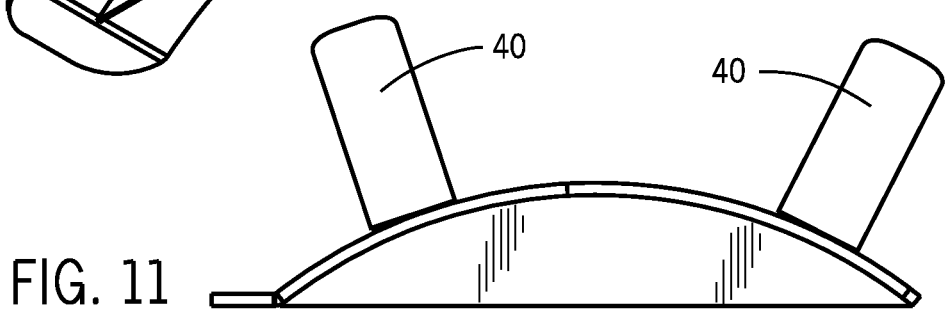
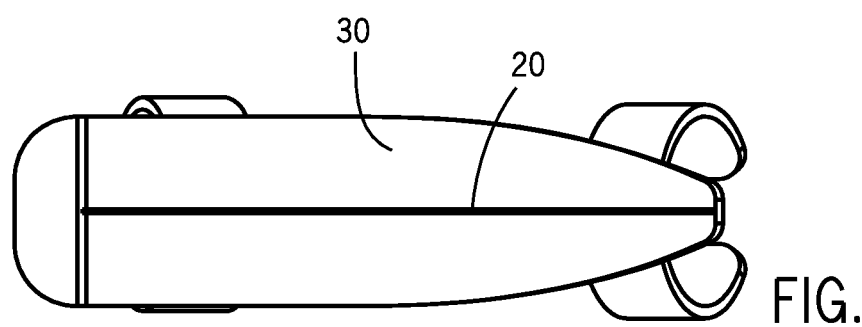

DEVICE FOR CRACKING AN EGG

CROSS REFERENCE TO RELATED APPLICATIONS

The following application is based on and claims the priority benefit of U.S. provisional application Ser. No. 61/951,156 filed Mar. 11, 2014 and Ser. No. 62/042,822 filed Aug. 28, 2014; the entire contents of both which are incorporated by reference.

BACKGROUND OF THE INVENTION

A device for cracking eggs is provided. The device has a generally flat blade portion secured to an arched base portion. The generally flat blade portion is used to cut or crack the egg. The generally flat blade portion is perpendicularly secured to the arched base portion wherein the arched base portion mirrors the arc of the exterior surface of an average egg. A user uses the generally flat blade portion to strike the egg. The arched base portion stops the generally flat blade portion from penetrating the egg past a predetermined point. In some embodiments, a padded attachment or a spring loaded contact surface may be secured to the arched base portion and may prevent the device from over-cutting or cracking the egg. In alternative embodiments, the back of the arched base portion has a loop for securing a finger. Finally, a handle may be secured to the arched base portion to easily grasp the device.

Over the years, attempts have been made to provide an efficient egg cracking device. For example, U.S. Pat. No. 8,069,779 to Dolub discloses a device for cracking open an egg, having egg-size sensing means for determining the size of an egg positioned in the device, thereby providing for automatic calibration of the device to the specific size of an egg to be cracked. The calibration determines how much would the distance between the piercing members and the imaginary longitudinal axis of the egg be reduced before the piercing members stop their advancing towards the egg and start moving apart for cracking its shell open. The device can thus open eggs of different sizes, e.g. having widths between 40 and 50 millimeters, accurately without requiring special preparation or manual calibration. A method for cracking open an egg based on said device is also shown.

Further, U.S. Pat. No. 5,083,508 discloses Banks et al discloses an egg cracking device which includes two formations which are adapted to move towards a central portion of an egg thereby to pierce the shell of the egg and then to move apart to crack the egg shell into the halves.

Still further, U.S. Pat. No. 4,542,584 to Talbot discloses an egg cracking device, which includes a pair of complementary egg support container parts. A pair of hingedly connected elongated handle arms are provided, one of each being connected to its egg container part, and being arranged to be moved from a closed position, in which the egg container parts abut against each other, to an open position, in which the egg container parts are moved apart. The device further includes biassing means urging the handle arms into the closed position; and a pair of egg cutter members connected to the egg container parts, and abutting against each other when the egg container parts are in the closed position. The egg cutter members are adapted each to grip a part of a cut egg shell and to keep the egg shell parts apart when the handle arms are pressed against the biassing means for opening the egg container parts.

U.S. Pat. No. 4,137,838 to Warren discloses an egg breaking machine in which a plurality of cooperating egg cracking heads and separators carried by a drive means, such as a roller chain, automatically crack and drain eggs and separate the liquid egg yolk and white. The drive chain carries the cracking head and separator combinations through egg loading, cracking, draining, and yolk and white separating positions. An improved cracker head is disclosed which operates in three automatically controlled positions including a fully closed, partially opened, and a fully opened position whereby the initial and subsequent shell drainage are facilitated. Additionally, an improved cracking head and separator mounting and spacing control means is disclosed for improving the drainage from the egg to the separator.

However, these patents fail to describe an egg cracking device which is easy to use and efficient as is described in the present application. Further, these patents fail to provide an egg cracking device which may break an egg in a predetermined fashion.

SUMMARY OF THE INVENTION

A device for cracking eggs is provided. The device has a generally flat blade portion secured to an arched base portion. The generally flat blade portion is used to cut or crack the egg. The generally flat blade portion is perpendicularly secured to the arched base portion wherein the arched base portion mirrors the arc of the exterior surface of an average egg. A user uses the generally flat blade portion to strike the egg. The arched base portion stops the generally flat blade portion from penetrating the egg past a predetermined point. In some embodiments, a padded attachment or a spring loaded contact surface may be secured to the arched base portion and may prevent the device from over-cutting or cracking the egg. In alternative embodiments, the back of the arched base portion has a loop for securing a finger. Finally, a handle may be secured to the arched base portion to easily grasp the device.

An advantage of the present egg cracking device is that the present device may have a finger loop for securing the egg cracking device to a single finger.

An advantage of the present egg cutting or cracking device is that the present device is easy to use.

Another advantage of the present egg cutting or cracking device is that the present device avoids the over-cracking of an egg.

Yet another advantage of the present egg cutting or cracking device is that the present device may have a padded attachment portion which prevents the device from over-cracking the egg.

Still another advantage of the present egg cutting or cracking device is that the present egg cracking device may have a spring loaded contact surface which prevents the device from over-cracking the egg.

Another advantage of the present egg cutting or cracking device is that the present device may be easily cleaned in a dishwasher.

Still another advantage of the present egg cutting or cracking device is that the present device prevents injury which may result from cutting or cracking an egg using other methods, such as a knife.

And another advantage of the present egg cutting or cracking device is that the present device has a soft grasping handle portion.

For a more complete understanding of the above listed features and advantages of the egg cutting or cracking device reference should be made to the detailed description and the drawings. Further, additional features and advantages of the invention are described in, and will be apparent from, the detailed description of the preferred embodiments.

BRIEF DESCRIPTION OF THE DRAWINGS

FIG. 3 illustrates a side perspective view of the egg cracking device in the finger embodiment.

FIG. 4 illustrates a side perspective view of the egg cracking device in the finger embodiment.

FIG. 5 illustrates a top perspective view of the egg cracking device in the finger embodiment.

FIG. 6 illustrates a side plan view of the egg cracking device in the finger embodiment.

FIG. 7 illustrates a front view of the egg cracking device in the finger embodiment.

FIG. 8 illustrates a bottom view of the egg cracking device in the finger embodiment.

FIGS. 9-12 illustrate an alternative embodiment of the egg cracking device in the finger embodiment wherein a plurality of finger loops are provided.

DETAILED DESCRIPTION OF THE PREFERRED EMBODIMENTS

Figure 1:
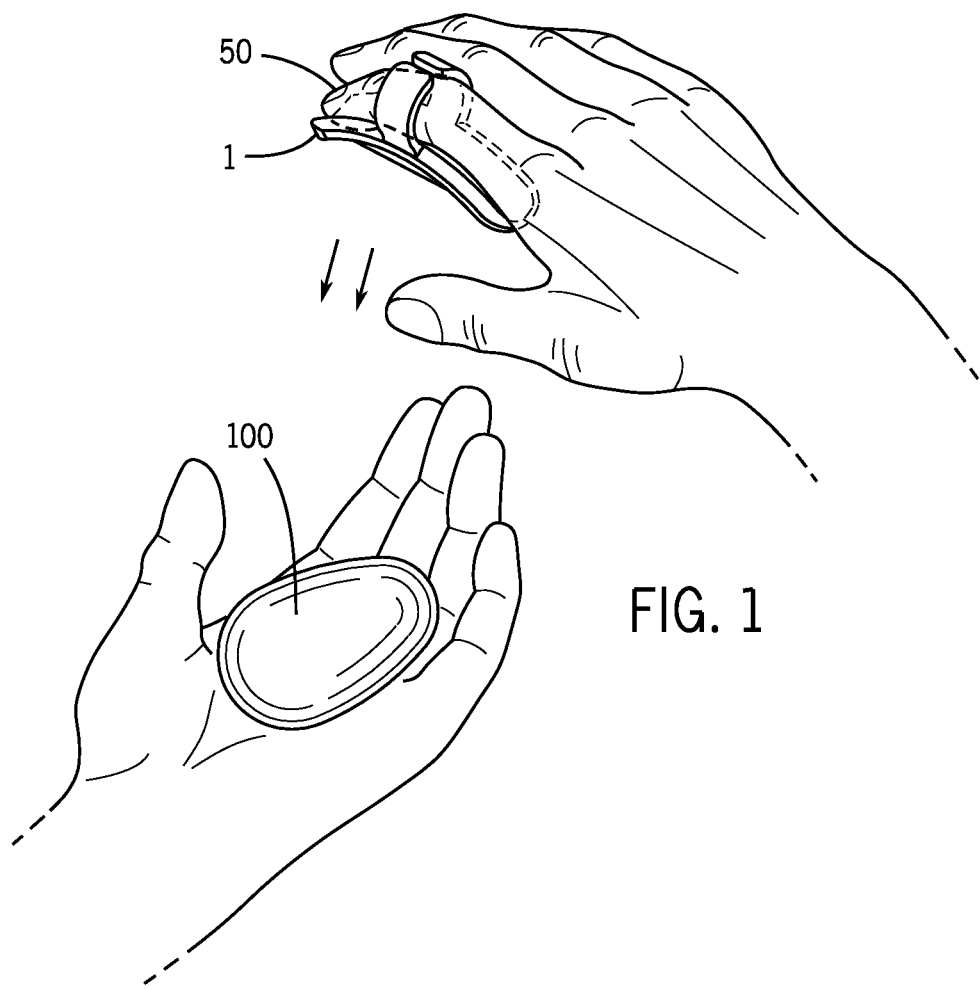
FIG. 1 illustrates a perspective view of an embodiment of the egg cracking device worn on the finger of a user.
Figure 2:
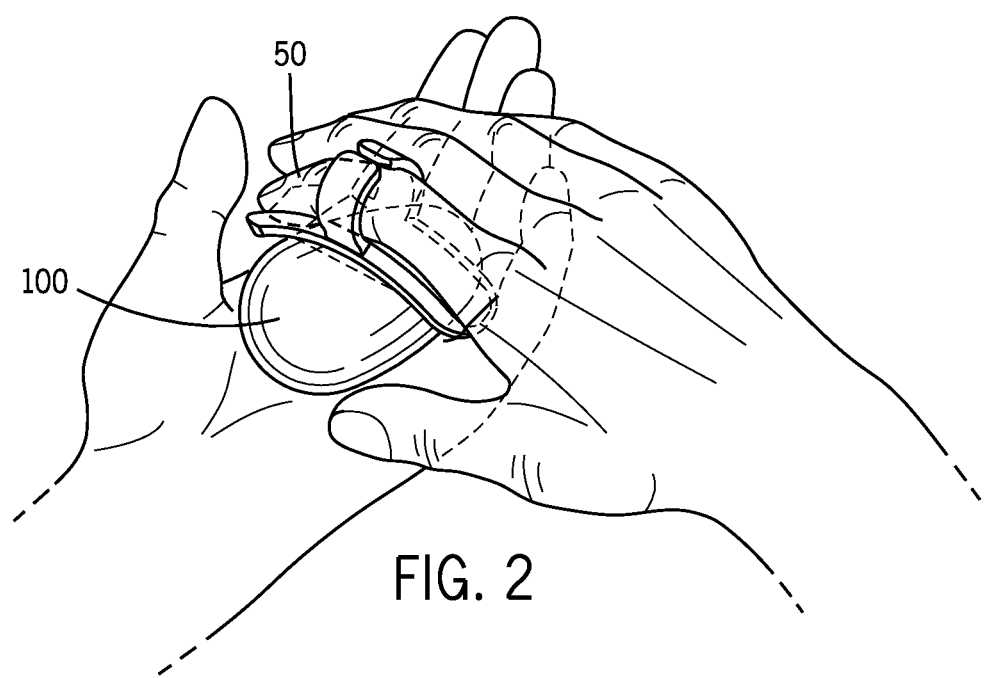
FIG. 2 illustrates a perspective view of an embodiment of the egg cracking device worn on the finger of a user wherein the device is in the process of cracking an egg.

A device for cracking eggs is provided. The device has a generally flat blade portion secured to an arched base portion. The generally flat blade portion is used to cut or crack the egg. The generally flat blade portion is perpendicularly secured to the arched base portion wherein the arched base portion mirrors the arc of the exterior surface of an average egg. A user uses the generally flat blade portion to strike the egg. The arched base portion stops the generally flat blade portion from penetrating the egg past a predetermined point. In some embodiments, a padded attachment or a spring loaded contact surface may be secured to the arched base portion and may prevent the device from over-cutting or cracking the egg. In alternative embodiments, the back of the arched base portion has a loop for securing a finger. Finally, a handle may be secured to the arched base portion to easily grasp the device.

Referring first to FIGS. 4 and 5, an egg cutting or cracking device 1 is provided. The egg cutting or cracking device 1 may have an arched based portion 30 having a top 2, a bottom 3, a front 4, a back 5, a first side 6 and a second side 7. The first side 6 of the egg cutting or cracking device 1 may be a mirror image of the second side 7 of the device 1.

In the first and preferred embodiment (the "finger embodiment"), a user's finger 50 may contact the top 2 of the device 1. In particular, located on the top 2 of the device may be a finger loop 40 having an opening 45 (FIG. 7). A split 41 may be located in the finger loop 40 so as to allow the finger loop 40 to slightly expand its diameter 47 (FIG. 7). The finger loop 40 may be made from, for example, a hard plastic so as to allow the finger loop 40 to slightly expand and later return to its relaxed, unexpanded shape. The expanded diameter 47 of the opening 45 may therein allow the device 1 to be secured around a finger 50 of a person by friction. In an alternative embodiment, FIGS. 9-12, the device 1 may have a plurality of finger loops 40 located on the top 2 of the arched base portion 30. Providing a plurality of finger loops 40 on the top 2 of the arched base portion 30 may allow a user to more securing control the egg cracking device 1 by allowing the user to insert a single finger 50 into multiple finger loops 40. In the embodiment with a single finger loop 40, the finger loop 40 may be located halfway between the front 4 and the back 5 of the device 1 so as to provide better stability for the device 1 during use.

In yet another alternative embodiment (FIGS. 13-18), located at the back 5 of the device 1 may be a griping portion 10. Preferably, the gripping portion 10 is made of rubber, plastic or stainless steel and is durable and easily cleaned, for example, in a dishwasher. In an embodiment, the gripping portion 10 may be removed for cleaning or replacing.

Figure 13:
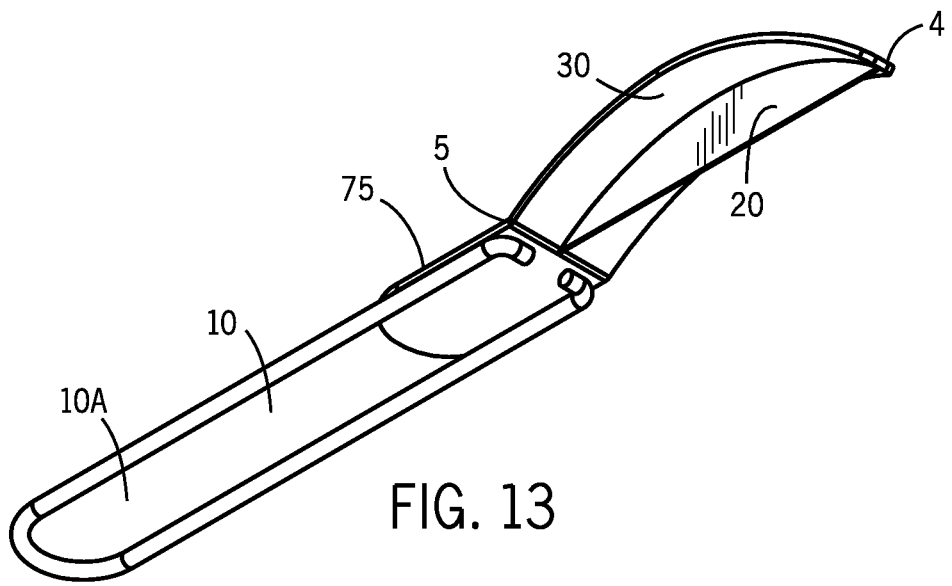
FIG. 13 illustrates a side perspective view of an alternative embodiment of the egg cracking device wherein a handle portion is provided.
Figure 14:
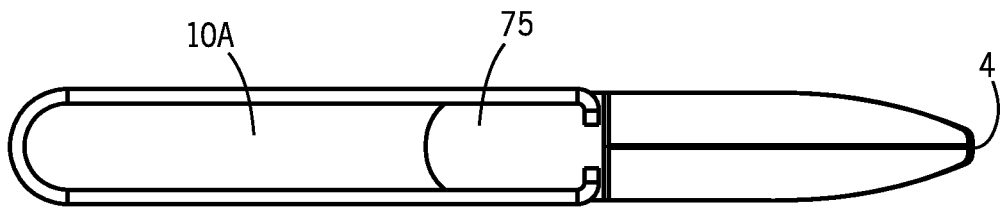
FIG. 14 illustrates a bottom view of the egg cracking device of FIG. 13.
Figure 15:
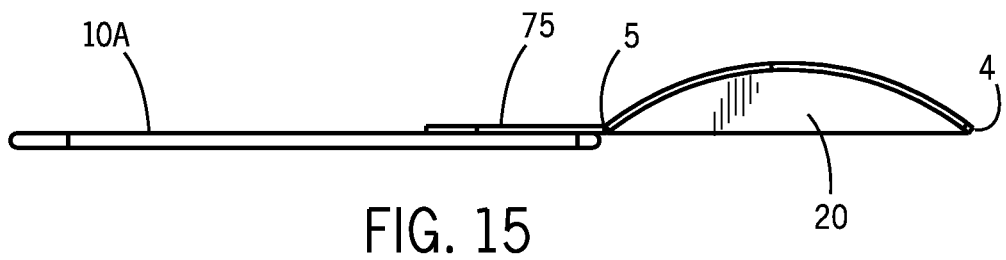
FIG. 15 illustrates a side view of the egg cracking device of FIG. 13.
Figure 16:
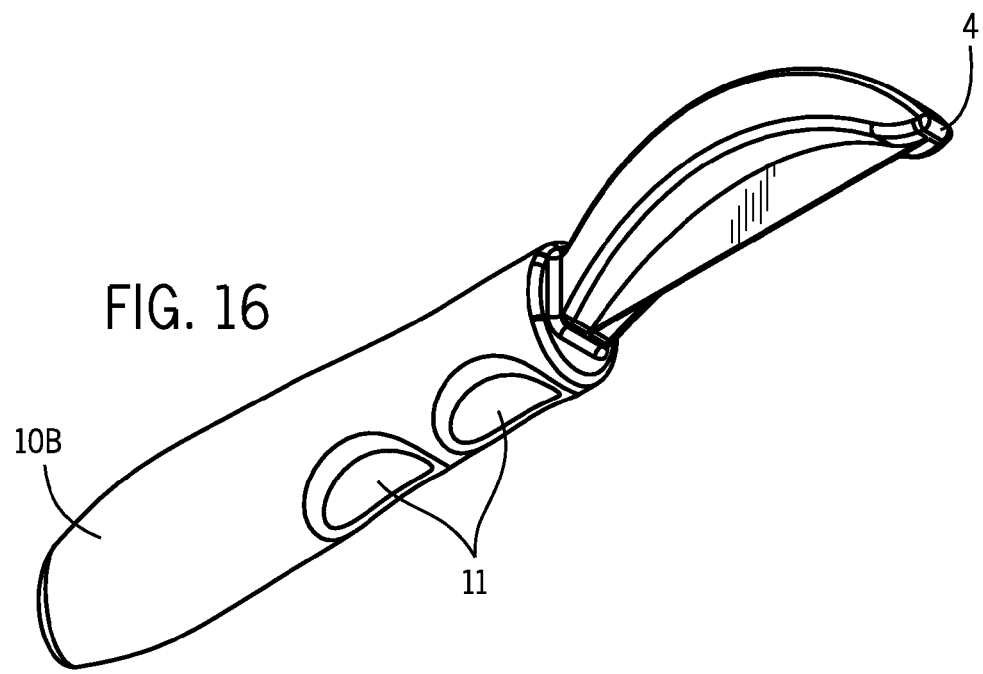
FIG. 16 illustrates a perspective view of another embodiment of the egg cracking device wherein the handle portion has a full handle.
Figure 17:
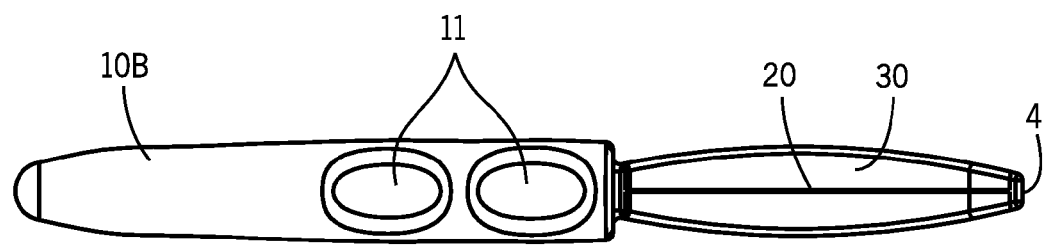
FIG. 17 illustrates a bottom view of the embodiment of the egg cracking device of FIG. 16.
Figure 18:
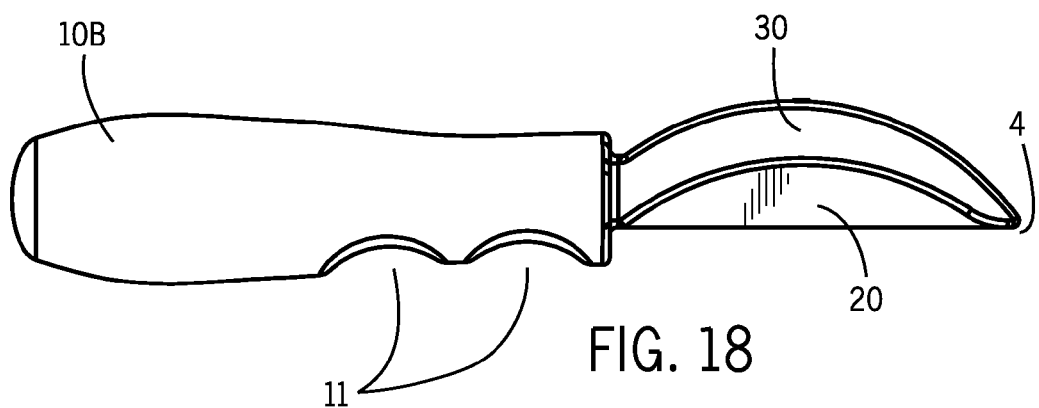
FIG. 18 illustrates a side view of the egg cracking device embodiment of FIG. 16.

FIGS. 13-15 illustrate a generally flat gripping portion 10A. The light weight generally flat gripping portion 10A may allow the device 1 to be easily transported and stored. In an alternative embodiment (FIGS. 16-18) the gripping portion 10B may be generally cylindrical. The generally cylindrical gripping portion 10B may be heavier, but may allow a user to more easily grasp the gripping portion 10B as the cylindrical shape more easily is secured in a clinched hand. Located on the generally cylindrical griping portion 10B may be a plurality of indentations 11. The plurality of indentations 11 may be generally arched-shape and may allow the user to grasp the device 1 more easily with his or her fingers 50.

The bottom 3 of the arched base portion 30 of the device 1 (and a blade portion 20) may be the portion of the device 1 which actually contacts an egg 100 (FIG. 1) during use. The bottom 3 of the device 1 may have a generally flat blade portion 20 having a top 21, a bottom 22 and a height 23 (FIG. 6). In an embodiment, the top portion 21 of the generally flat blade portion 20 may be generally curved and the bottom 22 may be generally straight. More specifically, the generally flat blade portion 20 may be generally in the shape of half of an oval. The curved top 21 of the generally flat blade portion 20 may be permanently secured to the bottom 3 of the arched base portion 30. The bottom 22 of the generally flat blade portion 20 may be generally thin enough so as to be able to easily cut or crack the egg 100; however, not too thin so as to easily cut the hand of a user as a knife may. More specifically, the generally flat blade portion 20 may have a width 60 (FIG. 7) and may have a length 61 (FIG. 8).

Referring again to FIGS. 4 and 5, the bottom 3 of the arched base portion 30 may be permanently secured to the top 21 of the generally flat blade portion 20. Further, the top 21 of the generally flat blade portion 20 may be generally perpendicular to the arched base portion 30. In particular, the generally flat blade portion 20 may generally bisect the arched base portion 30 and may divide the arched base portion 30 into two equal sections.

In an alternative embodiment, the arched base portion 30 may have a generally rectangular attachment portion 75 (FIGS. 13-15). The generally rectangular attachment portion 75 may connect the back 5 of the arched base portion 30 to the gripping portion 10A. Further, in an embodiment, the generally rectangular attachment portion 75 may extend at least partially within the gripping portion 10 (not shown) so as to provide for greater stability of the device 1.

In an embodiment, the arched base portion 30 may extend to the very most tip of the front 4 of the device 1. More specifically, the front 4 of the arched base portion 30 may extend beyond the generally flat blade portion 20 and may cover the tip of the generally flat blade portion 20 so as to prevent injury which may be caused by the front of the generally flat blade portion 20.

Figure 19:
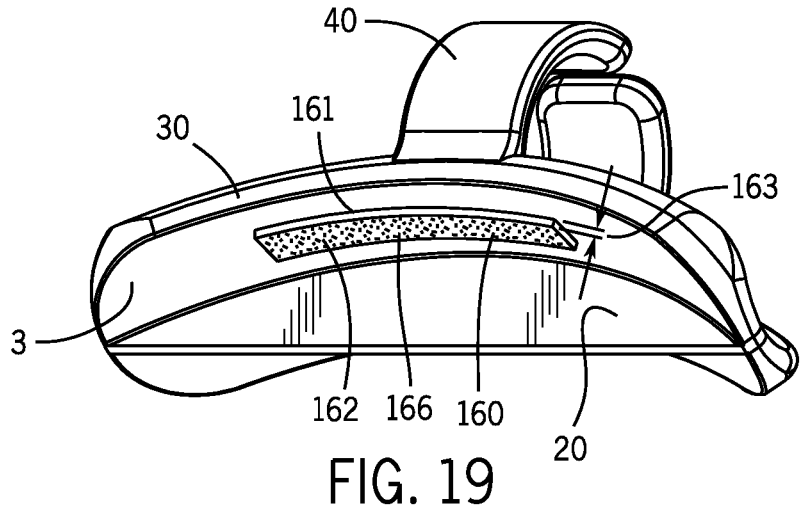
FIG. 19 illustrates an alternative embodiment of the egg cracking device wherein the egg cracking device has a padded portion located on the arched base portion.

Referring now to FIG. 19, in an alternative embodiment, the bottom 3 of the arched base portion 30 may have padded attachment 160. The padded attachment 160 may have a top 161, a bottom 162, and a height 163. The padded attachment 160 may be generally arched and may mirror the curvature of the arched base portion 30 so that the padded attachment 160 is secured to the arched base portion 30 in a generally flush manner. The top 161 of the padded attachment 160 may be permanently secured to the bottom 3 of the arched base portion 30 by, for example, glue (not shown). Preferably, the padded attachment 160 is located on both sides of the generally flat blade portion 20. In an embodiment, an antimicrobial agent 166 may also be added to the padded attachment 160 so as to reduce the chances of a microbial agent being introduced to the egg 100 once the egg 100 is cut or cracked.

In an embodiment, the height 163 of the padded attachment 160 is approximately two mm. The padded attachment 160 may prevent the arched base portion 30 (which is harder than the padded attachment 160) from over cutting or cracking the egg 100 by providing a softer contact surface then an unpadded arched base portion 30 against the exterior of the egg 100.

Figure 20:
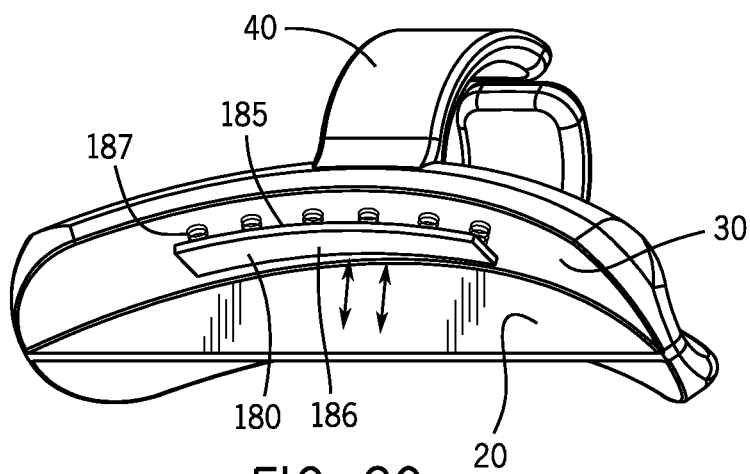
FIG. 20 illustrates an alternative embodiment of the egg cracking device wherein the egg cracking device has a spring loaded contact surface.

Referring now to FIG. 20, in yet another alternative embodiment, a spring loaded contact surface 180 may be secured to the arched base portion 30. The spring loaded contact surface 180 may have a top 185 and a bottom 186 and may act to reduce the force of the device 1 on the egg 100 in a manner similar to the padded attachment 160. The spring loaded contact surface 180 may have a generally arched shaped which mirrors the bottom 3 of the arched base portion 30. The top 185 of the spring loaded contact surface 180 may face toward the bottom 3 of the arched base portion 30.

Located between the top 185 of the spring loaded contact surface 180 and the bottom 3 of the arched base portion 30 may be at least one spring 187 (FIG. 20 illustrates six springs 187). The spring(s) 187 may allow the spring loaded contact surface 180 to move from a First Position A to a Second Position B. More specifically, when a user strikes the egg 100 with the generally flat blade portion 20 of the device 1, the generally flat blade portion 20 first makes contact with the egg 100 and begins to cut or crack the egg 100. As the generally flat blade portion 20 begins to enter the interior of the egg 100, the spring loaded contact surface 180 (or padded attachment 160 in that embodiment) may then come into contact with the exterior surface of the egg 100 on both sides of, and right next to, the cut or crack created by the generally flat blade portion 20. The spring 187 of the spring loaded contact surface 180 (or padded attachment 160) may reduce the acceleration of the device 1 on the egg 100 therein preventing the egg 100 from being over-cut or over cracked. More specifically, the spring loaded contact surface 180 (or padded attachment 160) may allow the generally flat blade portion 20 from only entering the egg 100 a predetermined distance, roughly equal to the height 23 (FIG. 6) of the generally flat blade portion 20. Without utilizing the device 1, cracking an egg 100 completely in half may result in the egg 100 contents spilling in an unwanted manner.

Using the device 1 to crack the egg 100 in the described predetermined manner creates a cut or crack in the egg 100. The cut or crack 100 may not completely cut the egg 100 in half, but may allow a user to use his/her hands to then break the egg 100 completely in half at the cut or crack in a desired location (such as over a skillet or bowl).

To use the device 1, a user may hold the egg 100 in one hand and the device 1 in the other hand. Preferably, the egg 100 is held such that the long axis of the egg 100 runs parallel to the length of the user's arm. A user then inserts his or her finger 50 into the finger loops 40 or the user grasps the gripping portion 10A or 10B of the device 1. The user then brings down the device 1 so that the generally flat blade portion 20 of the device 1 strikes the egg 100 in a generally perpendicular manner with respect to the long axis of the egg 100. Preferably, the generally flat blade portion 20 strikes the egg 100 approximately halfway between the ends of the egg 100 and preferably, the generally flat blade portion 20 creates a cut or crack approximately 0.3 to 0.6 inches in length.

As the generally flat blade portion 20 begins to penetrate the shell of the egg 100, the shell of the egg 100 is contacted by the bottom 3 of the arched base portion 30. The bottom 3 of the arched base portion 30 then prevents the generally flat blade portion 20 from further penetrating the egg 100. As a result, a cut or crack in the egg 100 is created. A user then may place the device 1 on a table and use both hands to crack the egg 100 over a skillet, bowl, or the like along the cut or crack created by the generally flat blade portion 20. In the embodiments having the padded attachment 160 or the spring loaded contact surface 180 the padded attachment 160 or the spring loaded contact surface 180 contacts the egg 100 instead of the bottom 3 of the arched base portion 30.

Figure 21:
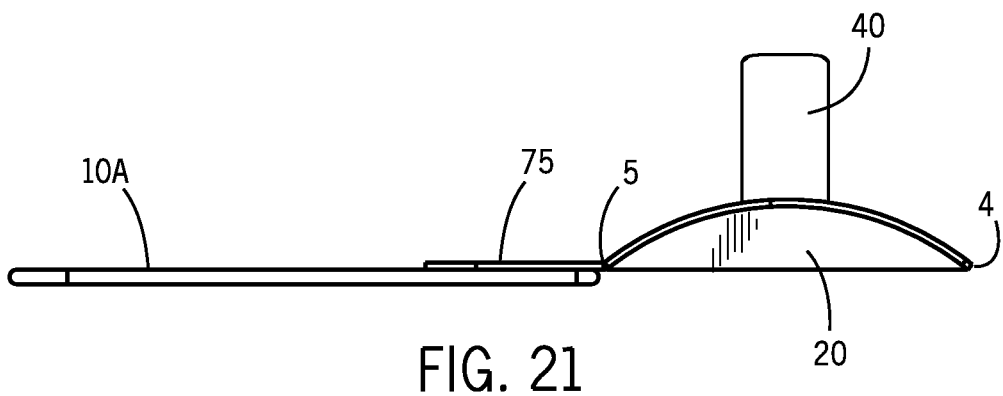
FIG. 21 illustrates yet another embodiment wherein the egg cracking device has both a handle portion and a finger loop portion.

Finally, referring now to FIG. 21, in yet another embodiment, the egg cracking device 1 may have a handle portion 10A or 10B and a finger loop portion 40. In this embodiment, the user may elective pick between using the finger loop portion 40 or the handle portion 10A or 10B. Further, in this embodiment, the handle portion 10A or 10B may be selectively removed from the main body (the arched based portion 30) so that the user may only use the device 1 with the finger loop portion 40.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A device for cracking an egg comprising:

a generally arched-shaped base portion having a front, a back, a first side, a second side, a top, a bottom, and a length extending from the front to the back of the generally arched-shaped base portion;

a generally flat blade portion wherein the generally flat blade portion has a top, a bottom, a first side, a second side, a front, a back and a length wherein the length of the generally flat blade portion extends from the front to the back of the generally flat blade portion and wherein the top of the generally flat blade portion is arched-shaped and aligns with and is perpendicularly connected with the bottom of the generally arched-shaped base portion and wherein the generally flat blade portion divides that generally arched-shaped base portion into two equal halves;

wherein the bottom of the generally flat blade portion has a straight edge;

wherein the generally flat blade portion divides the generally arched-shaped base portion into two halves and wherein the generally flat blade portion is used to crack an egg;

wherein the length of the generally arched-shaped base portion equals the length of the arched-shaped based portion; and wherein the top of the arched-shaped based portion has a receased concave portion for receiving a finger.

2. The egg cracking device of claim 1 further comprising:

a finger loop secured to the top of the generally arched-shaped base portion wherein the finger loop has an opening for receiving a finger.

3. The egg cracking device of claim 2 wherein the finger loop secured to the top of the arched-shaped base portion has a diameter and further has a slit allowing the finger loop to slightly expand in diameter to therein to secure a finger of a user.

4. The egg cracking device of claim 2 wherein the finger loop is located halfway between the front and the back of the generally arched-shaped base portion.

* * * * *